United States Patent [19]
Josephson

[11] Patent Number: 4,881,091
[45] Date of Patent: Nov. 14, 1989

[54] DATA CARD ILLUMINATION ARRANGEMENT

[75] Inventor: Donald G. Josephson, Wilmington, Mass.

[73] Assignee: Polaroid Corporation, Cambridge, Calif.

[21] Appl. No.: 318,959

[22] Filed: Mar. 6, 1989

[51] Int. Cl.⁴ ............................................. G03B 15/03
[52] U.S. Cl. ..................................... 354/132; 355/71; 362/16; 354/109
[58] Field of Search ............... 354/109, 110, 118, 120, 354/126, 132, 150, 75, 80; 355/67, 70, 71; 362/3, 8, 11, 16, 17

[56] References Cited

U.S. PATENT DOCUMENTS

| | | | |
|---|---|---|---|
| 2,830,512 | 4/1958 | Nagel | 354/126 X |
| 3,270,194 | 8/1966 | Lee | 355/67 |
| 3,683,764 | 8/1972 | Johnson | 354/109 |
| 3,928,863 | 12/1975 | Stewart et al. | 354/109 |
| 4,090,788 | 5/1978 | Massengeil | 355/71 |
| 4,248,517 | 2/1981 | Nishikawa | 362/16 |
| 4,626,091 | 12/1986 | Ostermeier | 354/75 |
| 4,627,704 | 12/1986 | Hamasaki et al. | 355/ |
| 4,634,248 | 1/1987 | Ostermeir | 354/110 X |

Primary Examiner—L. T. Hix
Assistant Examiner—Brian W. Brown
Attorney, Agent, or Firm—Alfred E. Corrigan

[57] ABSTRACT

A data card illumination arrangement for use within a compact identification card camera system and for providing uniform indirect illumination over the entire information bearing surface of a data card. The arrangement includes a pair of illumination assemblies subtended by a pair of side reflector elements. Each of the illumination assemblies includes a strobe tube, a U-shaped channel member having a comb filter portion, and a planar reflector. One of the assemblies is located adjacent and parallel to the upper surface of the data card while the other is located adjacent and parallel to the lower surface of the data card. Illumination provided by each of the strobe tubes is directed away from the data card. The planar reflectors redirect the illumination toward the data card. This redirected illumination passes through the comb filter portions of the channel members to facilitate uniform indirect illumination of the data card. The side reflector elements are positioned so as to ensure uniform illumination over the right and left hand edges of the data frame. The data card illumination arrangement of the present invention not only provides for uniform illumination of the data card but also fits within the limited area available within a compact identification card camera system.

13 Claims, 4 Drawing Sheets

DATA CARD ILLUMINATION ARRANGEMENT

BACKGROUND OF THE INVENTION

1. Field of the Invention

This invention relates to photographic apparatus and, more particularly, it concerns an illumination arrangement for use in compact identification card camera systems and by which film is uniformly exposed to a data card image.

2. Description of the Prior Art

Identification card camera systems which produce a composite card having a subject portrait image and a data image are known in the photographic arts. The subject portrait image is produced by a conventional objective lens, shutter, and flash unit arrangement. The camera system includes either a filter or mask to confine the subject portrait image to a particular portion of the film within the camera system. The data image may include identification information such as name, ID number and signature contained in a data frame of a data card. The data image is produced by photographically reproducing at least the data frame portion of a data card housed in an illumination compartment having an internal source of illumination and a lens system separate from the above-mentioned objective lens. The camera system includes reflective elements and filters or masks to direct the data card image to the film and confine the data card image to a portion of the film not subject to the portrait image.

Typically, the data card illumination compartment does not include a shutter and relies on an internal flash illumination source to expose the film. The quality of the data card image on the film depends, therefore, on the quality of flash exposure provided by the internal illumination source. For example, in order to provide for a uniform exposure of the film to a light image of the data card, the illumination source must provide uniform illumination of the data card. In a conventional relatively large sized camera system, uniformity in the illumination of the data card is achieved by use of a large size data card compartment which allows the source to be spaced adequately from the card for dispersion of the illumination prior to reaching the data card.

However, when it is necessary to provide flash illumination of a data card within the confines of a very compact, portable identification card camera system, for example, it is not possible to locate the illumination source an adequate distance away from the data card to allow for dispersion of the illumination. Further, conventional flash illumination sources, such as electronic flash units or strobe tubes, produce an intense nonuniform illumination along their length. Placement of such a conventional flash unit close to the data card, not only does not allow for dispersion to compensate for the different distances between the flash unit and all the areas of the data card, but also does not accommodate dispersion to compensate for the nonuniform illumination along the length of the flash unit. Hence, use of such flash units as illumination sources in the data card compartment of a very compact camera system produces a flash exposure having undesirable hot spots and areas of poor illumination.

Thus, a need exists for an illumination arrangement providing for adequate and uniform illumination of the entire data frame of a data card to provide a uniform flash exposure of the film and at the same time accommodate the dimensional constraints of a compact identification card camera system.

SUMMARY OF THE INVENTION

In accordance with the present invention, a data card illumination arrangement is provided which ensures uniform flash exposure of the film in a compact identification card camera system to a light image of data on a data card.

The data card illumination arrangement of the present invention is embodied in a frame-like structure including a pair of illumination assemblies subtended by a pair of side reflectors. Each of the illumination assemblies includes a strobe tube, a U-shaped channel member, a comb filter and a planar reflector. One of the assemblies is located adjacent and parallel to the top of the data card while the other is located adjacent and parallel to the bottom of the data card. Each of the assemblies is of a length corresponding to the width of the data frame of the data card. Each of the strobe tubes is supported within one of the substantially U-shaped channel members so that the illumination provided by the tubes is directed away from the data card. This illumination is redirected toward the data card by the planar reflectors. A substantial portion of the redirected illumination passes through the comb filters to provide for uniform illumination and eliminate hot spots along the upper and lower edges of the data frame. The side reflectors aid in providing uniform illumination to the sides of the data frame.

A principal object of the invention is the provision of a data card illumination arrangement by which uniform indirect illumination of the data card is assured. Another object of the present invention is the provision of such an illumination arrangement which is employed in a small space and as such allows for compact camera system design. Other objects and further scope of applicability of the present invention will become apparent from the detailed description to follow taken in conjunction with the accompanying drawings in which like parts are designated by like reference characters.

DETAILED DESCRIPTION OF THE PREFERRED EMBODIMENT

Figure 1:
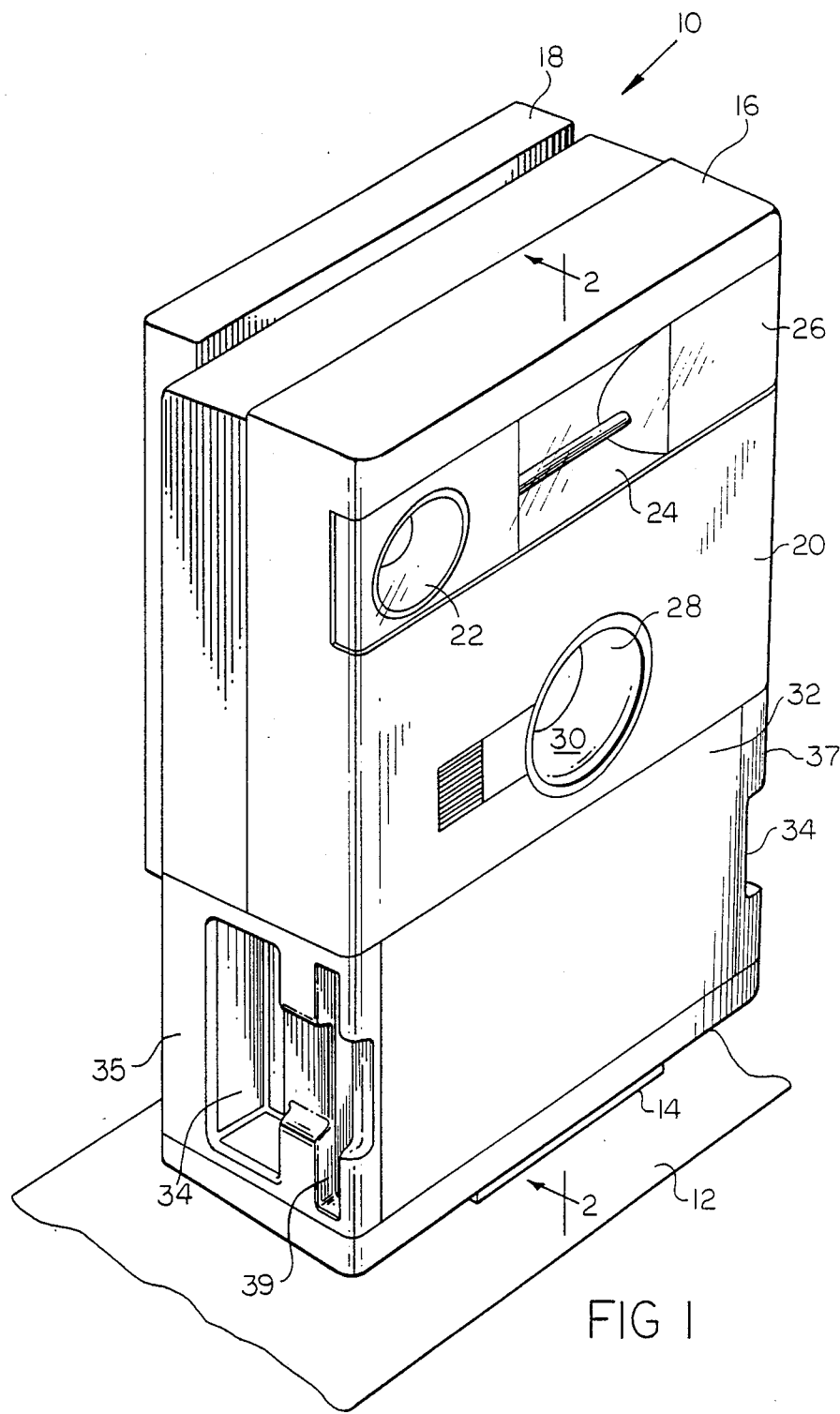
FIG. 1 is an isometric view illustrating an exemplary camera system within which the data card illumination arrangement of the present invention is housed.
Figure 2:
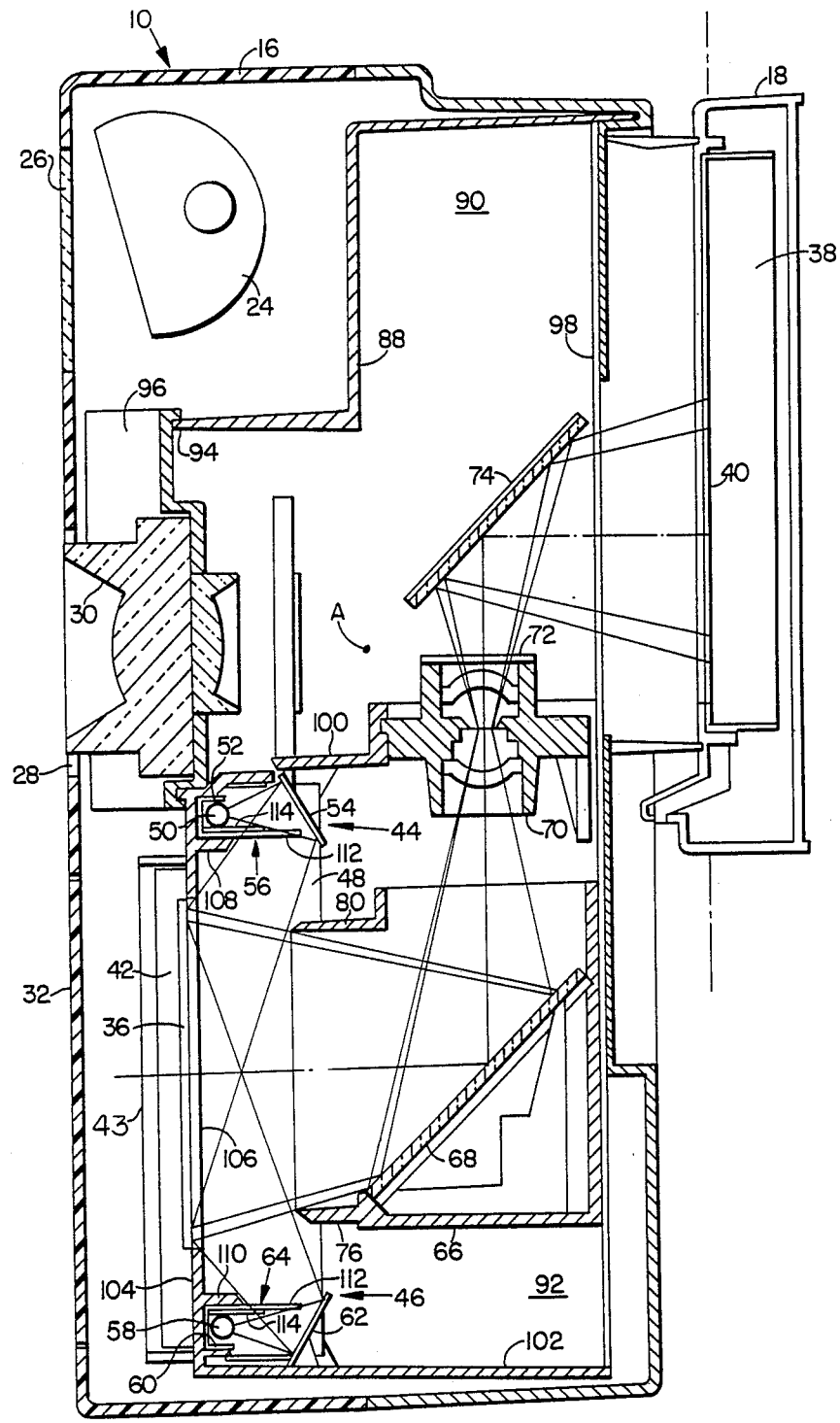
FIG. 2 is a fragmentary cross-section on line 2—2 of FIG. 1 illustrating the orientation of components during illumination of the data card.

In FIGS. 1 and 2 of the drawings, an exemplary compact identification card camera system incorporating the data card illumination arrangement of the present invention is generally designated by the reference numeral 10 and shown to be mounted on a base structure 12 via a mounting element 14. The camera system 10 includes a substantially rectangular housing 16 and a removable film holder 18; is of a compact design so that the rectangular housing 16 has height and width dimensions nearly equal to that of the film holder 18; and is of a type which produces a composite identification card constituted by a subject image and a data image. For the sake of clarity, only those elements of the exemplary camera system 10 necessary to provide an understanding of the working environment and size constraints placed on the present data card illumination arrangement will be described.

The rectangular housing 16 has a front housing portion 20 which accommodates an aiming device 22, an electronic flash unit 24 and a translucent cover 26 which overlies both the aiming device 22 and the flash unit 24. The front portion 20 has a central circular opening 28 in which an objective lens 30 is mounted. The housing 16 includes a lower portion 32 having recessed hand grips 34 in each side wall 35 and 37 thereof. The side wall 35 is also provided with a slot 39 for enabling the slidable insertion and removal of a data card holder 42 for the data card 36 (FIG. 2) into a support frame 43.

The film holder 18 houses a conventional film pack 38 in a manner presenting successive self-developing film units to a focal plane 40. The film holder 18 is slidably mounted on the back of the housing 16 so that each successive film unit may be exposed to two separate composite identification card images.

In FIG. 2 of the drawings, the relative positions of the camera system components are shown during exposure of a portion of a film unit to a data card image. The data card 36 is supported in a substantially vertical orientation by the data card holder 42 located in the frame 43. The information or data frame of the data card 36 is illuminated by the frame like data card illumination arrangement of the present invention which includes upper and lower illumination assemblies 44 and 46, respectively, subtended by a pair of side reflectors 48.

The upper assembly 44 includes a strobe tube 50 supported in a U-shaped channel member 52 so as to be located slightly above and oriented parallel to the upper surface of the data card. The sides of the channel member 52 are formed from polished aluminum which ensure that illumination provided by the strobe tube 50 is directed away from the data card. A planar reflector 54 is positioned at an angle in front of the open side of the channel member 52 and serves to redirect the illumination provided by the strobe tube 50 toward the data card 36. The channel member 52 has a comb filter portion 56 along the edge closest to the data card and extending toward the planar reflector 54. Thus, a portion of the redirected illumination from the reflector 54 passes through the comb filter portion 56 on its way to the data card. The comb filter portion 56 serves to disperse the illumination directed toward the upper edge of the data card and provide a more uniform distribution of illumination as will be described in greater detail below.

The lower illumination assembly 46 is a mirror image of the upper assembly 44 and includes a strobe tube 58 positioned within a U-shaped channel member 60 so as to be located slightly below and oriented parallel to the lower surface of the data card 36. A planar reflector 62 is positioned at an angle in front of the channel member 60 to redirect the illumination provided by the strobe tube 56. A comb filter portion 64 of the U-shaped channel member 60 extends toward the planar reflector 62 to disperse a portion of the redirected illumination and provide a uniform distribution of indirect illumination.

As shown in FIG. 2, the reflected data card image produced by the data card illumination arrangement of the present invention is initially directed along a horizontal optical axis into a reflector unit 66. The unit 66 supports a planar reflector 68 at an angle selected to direct the data card image along a substantially vertical optical axis. The vertically directed data card image passes through a lens barrel 70 and a polarizer 72 to an upper planar reflector 74 which redirects the reflected data card image to a substantially horizontal path so as to expose the film unit. At this point it should be noted that the strobe tubes 50 and 58 are simultaneously energized through conventional circuit elements (not shown) to produce the data card illumination depicted in FIG. 2.

The reflector unit 66 has a forwarded facing rectangular opening defined by four planar extensions 76, 78, 80 and 82. These extensions are dimensioned so as to limit the illumination transmitted to the planar reflector 68 to that which is reflected from the surface of the data card. As shown in FIG. 2, the extensions 76 and 80 block any direct illumination from the strobe tubes 58 and 50, respectively.

In the illustrated embodiment, the housing 16 encloses an internal component support structure 88 separated into upper and lower compartments 90 and 92, respectively, near the lens barrel 70. The upper compartment 90 has a forwardly directed opening 94 which receives an objective lens support structure 96 and a rear opening 98 which allows for transmittance of either the data card image or the subject portrait image to the focal plane 40. The lower data card illumination compartment 92 has an upper surface defined in large part by a lens barrel support formation 100 and a lower surface defined by a lower wall 102. The lower compartment 92 both encloses and supports the present data card illumination arrangement and the reflector unit 66. The lower chamber 92 has a front wall 104 which includes a rectangular data card illumination opening 106 and upper and lower illumination assembly support formations 108 and 110. Each of the support formations 108 and 110 includes planar extensions for facilitating proper positioning and attachment of the channel members 52 and 60 of the illumination assemblies 44 and 46, respectively.

The planar reflectors 54 and 62 are fixed at the appropriate angles necessary to provide indirect illumination of the entire data frame of the data card 36. By using the planar reflectors 54 and 62 to provide a folded light path from each of the strobe tubes 50 and 58 to the data card 36, the light impinging upon the data card 36 is spread across the surface of the card as though it had emanated from illumination sources located at the points marked A and B (FIG. 2). Thus, by employing the planar reflectors 54 and 62, the illumination assemblies 44 and 46 provide illumination of the data card without requiring the vertical dimension of the lower chamber 92 to be much more than the height of the data card.

Figure 3:
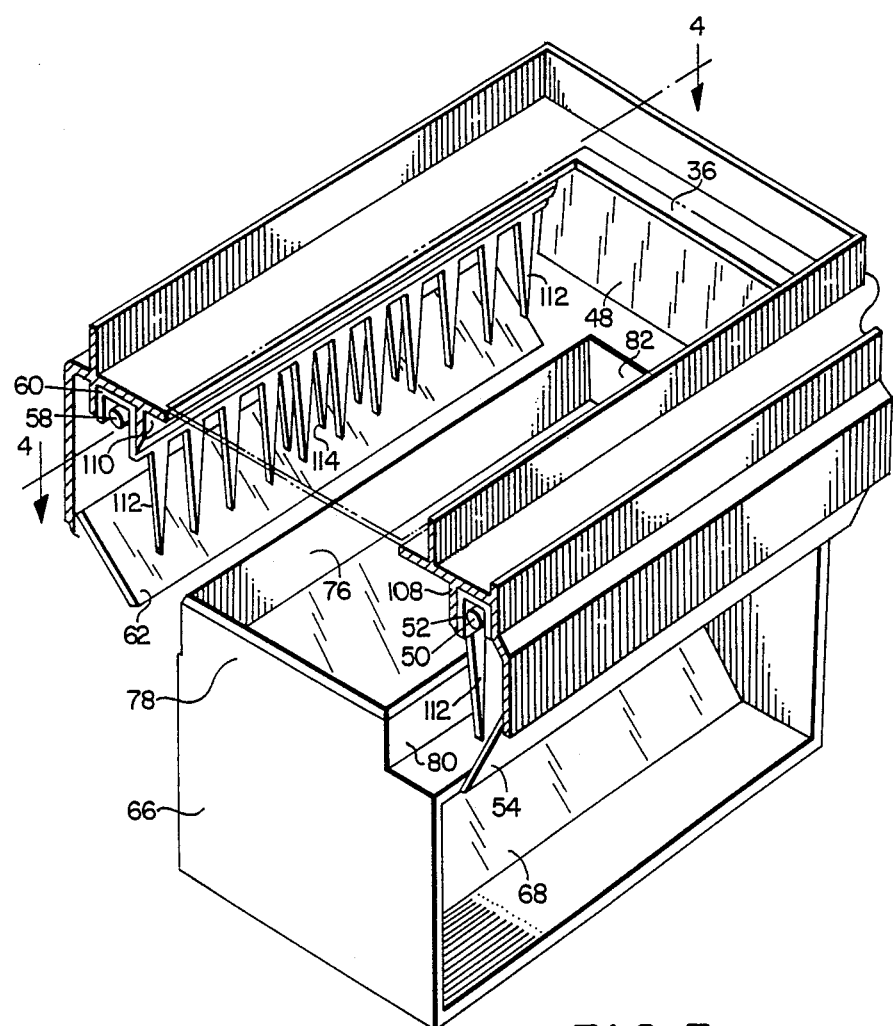
FIG. 3 is an isometric view representation of the data card illumination arrangement and reflector unit of FIG. 2.

With particular reference to FIG. 3, the present illumination arrangement and the reflector unit 66 are shown in a position as though the camera system 10 of FIG. 2 had been laid on its back. Each of the comb filter portions 56 and 64 of the channel members 52 and 60, respectively, is made up of a set of like dimensioned triangular comb teeth 112 separated by equal spaces and a second smaller set of triangular comb teeth 114 positioned to lie between the teeth 112 near the center of the comb filter. Because the strobe tubes 50 and 58 are discharge type illumination elements, they produce more intense illumination near the center than at each end. Thus, the comb teeth 114 are placed between the teeth 112 near the center of each of the comb filters to provide a denser comb pattern which will compensate for the uneven illumination produced by the strobe tubes.

Figure 4:
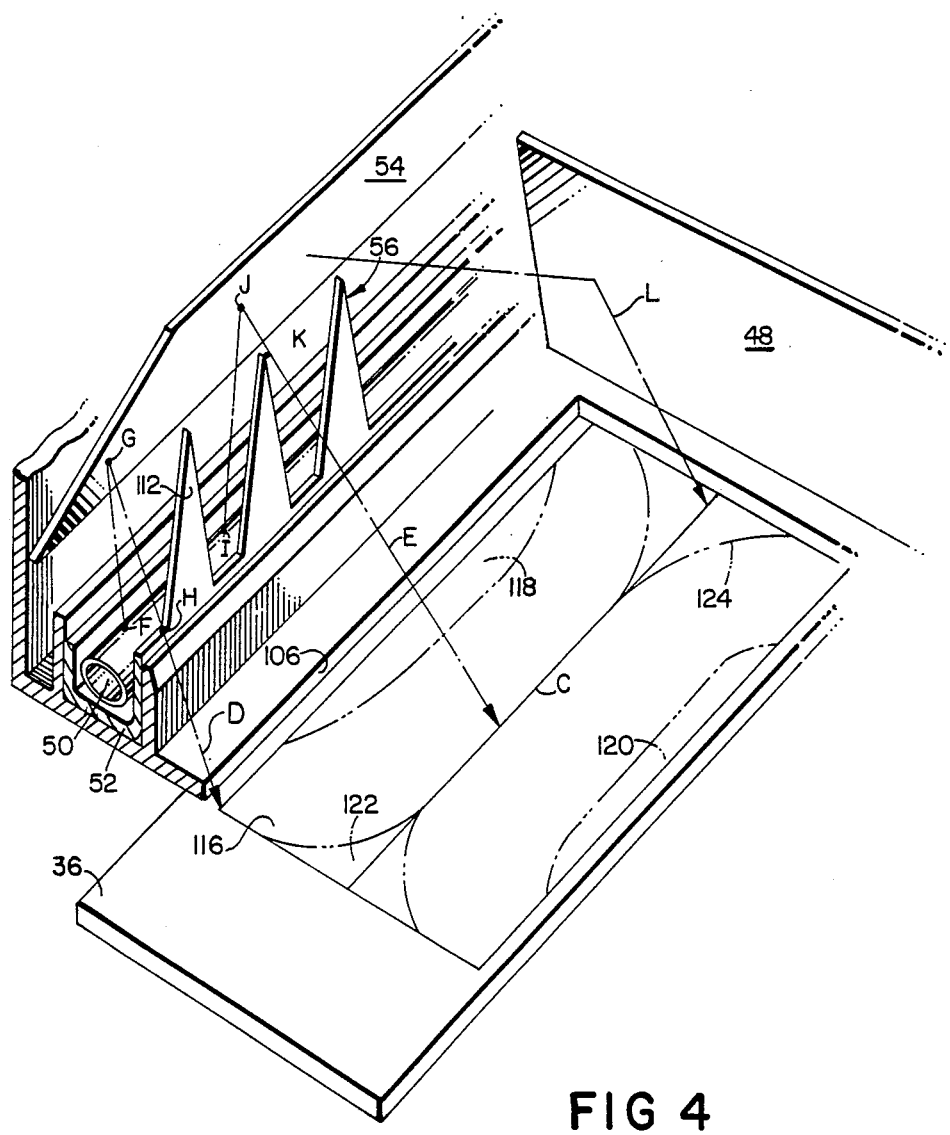
FIG. 4 is an inverted, fragmentary cross-section on line 4—4 of FIG. 3.

As shown in the illustrated embodiment of FIGS. 2, 3 and 4, the first set of teeth 112 are formed in one edge of each of the channel members 52 and 60, respectively. The second set of teeth 114 are fixedly attached to the inner surface of each of the channel members 52 and 60, respectively, by, for example, an adhesive.

Although only a single side mirror 48 appears in FIGS. 2-4, the present data card illumination arrangement includes a side reflector 48 at each end of the illumination assemblies 44 and 46. Each of the illumination assemblies 44 and 46 is of a length corresponding to the width of the opening 106, for example, 5 inches. As shown schematically in FIG. 4, the reflector element 54 is mounted to be parallel to the strobe tube 50 while the side reflector 48 is mounted to be perpendicular to the strobe tube 50. A data frame 116 of the data card 36 is shown to be separated into upper and lower halves by a center line C. Exemplary light rays D and E delineate the extent to which illumination of the data frame is affected by the comb filter 56.

More particularly, light ray D which emanates from the flash tube 50 at point F, is reflected by the planar reflector 54 at point G, passes over point H at the base of the first comb tooth 112, and strikes the upper edge of the data frame 116. Light ray E which emanates from the discharge tube 50 at point I is reflected by the planar reflector 54 at point J, passes over the point K at the end of the second comb tooth 112, and strikes the center line C of the data frame 116. The light ray D has to travel a shorter distance to reach the data card than the light ray E and as such strikes the data card with greater intensity. The comb teeth 112 are triangular in shape in order to progressively block more of the illumination the shorter the distance the illumination has to travel to reach the data card. In other words, the triangular comb teeth 112 block more of the illumination directed to the top edge of the data frame 116 than directed toward the center of the data frame 116. The comb teeth 112 do not block illumination from the strobe tube 50 which has to travel to the lower half of the data frame 116. In this manner, the triangular shape of the comb teeth 112 compensates for the difference in intensity of the illumination due to the various distances the illumination must travel before reaching the data card.

Although not shown in FIG. 4, the comb filter 64 acts in the same fashion as the comb filter 56, except that the comb filter 64 affects the illumination provided by the strobe tube 58 and directed at the lower half of the data frame 116. The channel members 52 and 60 and the comb filters 56 and 64 are formed of a reflective material such as aluminum. Because the teeth 112 and 114 are reflective, they serve to block some of the illumination without substantially diminishing the total amount of illumination provided by strong tubes. Thus, the illumination of the upper half of the data frame 116 is a mixture of high intensity illumination from strobe tube 50 and low intensity illumination from strobe tube 58. Likewise, the illumination of the lower half of the data frame 116 is a mixture of high intensity illumination from the strobe tube 58 and low intensity illumination from the strobe tube 50.

The regions 118 and 120 depicted in phantom lines in FIG. 4 correspond to hot spots which would be produced if the comb filters 56 and 64, respectively, did not include the comb teeth 114 in addition to the comb teeth 112. The regions 122 and 124 shown in phantom lines, represent areas of low illumination which would result if the side reflectors 48 were omitted. Each of the reflectors 48 is fixed at a slight angle, for example, 11° with respect to a plane normal to the data card 36. This tilt of the reflectors 48 causes the illumination reflected by the reflectors 48 to be directed at the sides of the data frame 116 as shown by the examplary light ray L. Thus, the reflected data frame image, which makes up the light image of the data frame to which the film is exposed, is formed of a mixture of the illumination from each of the strobe tubes 50 and 58 which is reflected by one of the planar reflectors 54 and 64, passes by the comb filters 56 and 64 and either strikes the data card directly or is reflected by one of the side reflectors 48 and then strikes the data card.

Thus, it will be appreciated that as a result of the present invention, a highly effective data card illumination arrangement for identification card camera systems is provided and by which the stated objectives, among others, are completely fulfilled. The data card illumination arrangement of the present invention provides for uniform indirect illumination of the entire data frame of the data card. This arrangement of strobe tubes, comb filters and reflectors eliminates hot spots and shadows and provides for an even illumination across the entire width of the data frame. As such, the present invention provides for a uniform flash exposure of the film resulting in a quality data card image. It is contemplated that modifications and/or changes may be made in the illustrated embodiment without departure from the invention. For example, while each of the comb filters are shown as being formed of two sets of teeth 112 and 114 in the illustrated embodiment, unitary comb filters incorporating both the teeth 112 and 114 are contemplated.

Further, it will be apparent to those skilled in the art from the foregoing description and accompanying drawings that additional modifications and/or changes may be made, again without departure from the invention. Accordingly, it is expressly intended that the foregoing description and accompanying drawings are illustrative of the preferred embodiment only, not limiting, and that the true spirit and scope of the preset invention be determined by reference to the appended claims.

What is claimed is:

1. A data card illumination arrangement for use in a compact portable identification card camera system, comprising: means for defining a data card illumination compartment; a data card support structure for supporting a data card holder in
    position for a data card frame supported thereby to be exposed,
    said support structure being located within said illumination
    compartment; means for defining an opening in a wall of said illumination compartment
    to permit loading of the data card holder into said
    support structure; first and second linear sources of illumination mounted on opposite ends
    of said support structure;
    reflector means mounted adjacent each of said first and second linear sources of illumination for reflecting light therefrom back toward said support structure; and filter means extending along the length of each of said first and second linear sources of illumination for providing uniform dispersion of
illumination reflected by said reflector means over the data frame.

2. The data card illumination arrangement of claim 1, wherein said reflector means includes first and second planar reflectors each mounted parallel to one of said linear sources of illumination.

3. The data card illumination arrangement of claim 2, wherein said filter means includes first and second comb filters each mounted parallel to one of the linear sources.

4. The data card illumination arrangement of claim 3, wherein each of said first and second comb filters has a comb configuration provided by a plurality of spaced triangular comb teeth.

5. The data card illumination arrangement of claim 4, wherein said linear sources of illumination produce a flash of illumination having a greater intensity near the center of each source and wherein each of said comb filters has a length at least sufficient to affect the illumination produced near the center of each of said linear sources.

6. The data card illumination arrangement of claim 5, wherein each of said comb filters has a length substantially equal to the width of the data frame and has a denser comb pattern near its center than at its opposite ends.

7. The data card illumination arrangement of claim 6, wherein each of said comb filters is made of a reflective material.

8. The data card illumination arrangement of claim 7, wherein said planar reflectors are mirrors.

9. The data card illumination arrangement of claim 8, wherein said data card illumination compartment supports a reflector unit opposite the data card, said reflector unit having means for defining an opening and blocking direct illumination from said linear sources of illumination from entering the reflector unit.

10. The data card illumination arrangement of claim 9, wherein said reflector means further includes a pair of side reflectors subtending said first and second planar reflectors.

11. The data card illumination arrangement of claim 10, wherein said reflector means further includes first and second U-shaped channel members each positioned about one of said first and second linear sources of illumination for directing a portion of the illumination provided by said linear sources of illumination toward said first and second planar reflectors.

12. The data card illumination arrangement of claim 11, wherein at least a portion of each of said comb filters is formed along one edge of each of said U-shaped channel members.

13. The data card illumination arrangement of claim 12, wherein said data card illumination compartment includes means for supporting each of said U-shaped channel members adjacent and parallel a respective edge of the data frame.

* * * * *